United States Patent [19]

Stamboulian et al.

[11] Patent Number: 4,732,347
[45] Date of Patent: Mar. 22, 1988

[54] EASY RELEASE TENSION RELIEVER

[75] Inventors: Nazareth Stamboulian, Los Angeles; William Hollowell, Pacific Palisades, both of Calif.

[73] Assignee: American Safety Equipment Corporation, Troy, Mich.

[21] Appl. No.: 412,880

[22] Filed: Aug. 30, 1982

[51] Int. Cl.[4] ............................................. B60R 22/44
[52] U.S. Cl. ................................................ 242/107.6
[58] Field of Search ................. 242/107.4 R-107.4 E, 242/107.6, 107.7; 74/577 SF, 577 S; 188/82.7, 82.3, 82.34, 82.77, 82.4, 82.1; 254/376; 280/806, 807; 297/475

[56] References Cited

U.S. PATENT DOCUMENTS

| | | | |
|---|---|---|---|
| 59,273 | 10/1866 | Rundell | 188/82.34 |
| 147,817 | 2/1874 | Bryant | 74/577 S |
| 248,883 | 11/1881 | Ralston | 74/577 S |
| 1,900,725 | 3/1933 | Moffett | 188/82.3 |
| 3,491,966 | 1/1970 | Curran et al. | 242/107.6 X |
| 3,700,184 | 10/1972 | Francis | 242/107.6 X |
| 4,153,274 | 5/1979 | Rogers, Jr. et al. | 242/107.7 X |
| 4,486,007 | 12/1984 | Kuhlman | 254/376 |

Primary Examiner—John M. Jillions
Attorney, Agent, or Firm—Poms, Smith, Lande & Rose

[57] ABSTRACT

An improvement to ratchet wheels having a releasable pawl for engaging the ratchet wheel to prevent rotation thereof so as to allow release of the pawl from engagement with the ratchet wheel at a lower force. The pawl is in two parts hingedly joined together for movement between a locked position in an over-the-center state and a released position where the pawl is free to flex. A cam disc is operably connected to the pawl to move the pawl to the released position. In the absence of pressure from the cam disc, the pawl returns to the locked state from gravity and/or a spring member.

4 Claims, 6 Drawing Figures

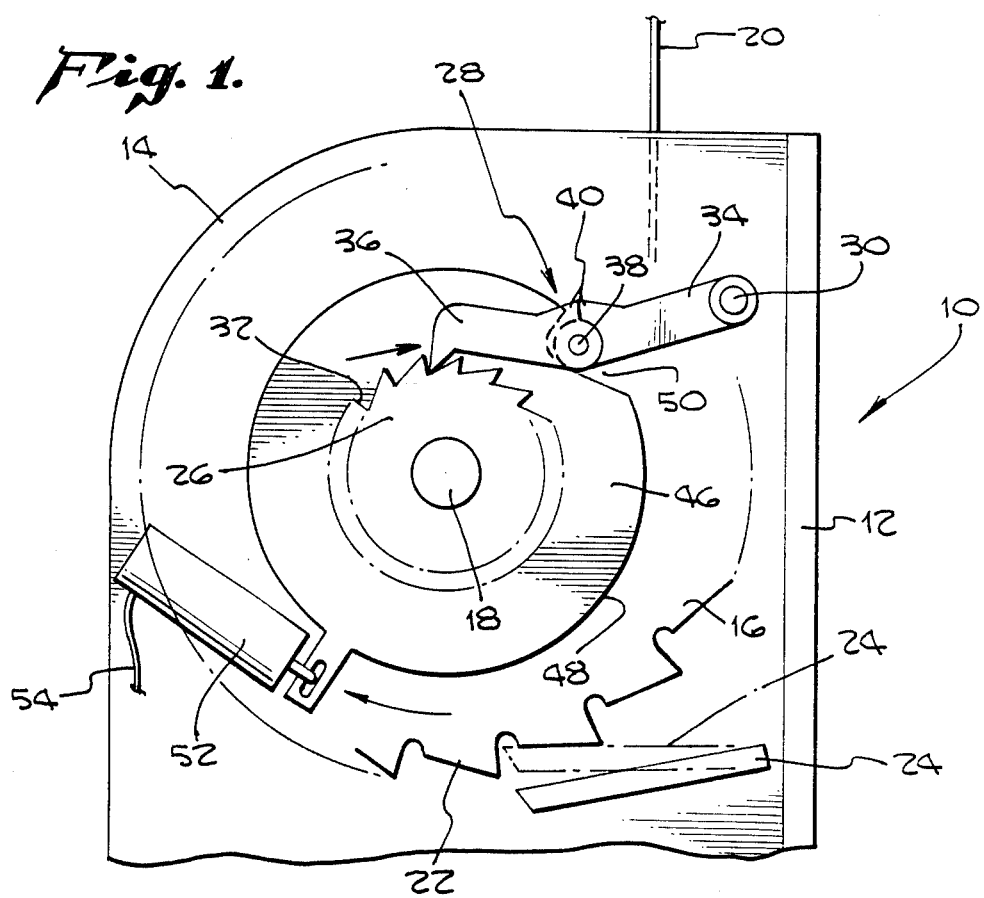

EASY RELEASE TENSION RELIEVER

BACKGROUND OF THE INVENTION

The present invention relates to seat belt retractor mechanisms, and, more particularly, to retractor mechanisms, including a ratchet wheel and releasable pawl for holding a seat belt webbing in a non-tension state about an occupant.

Seat belt retractor mechanisms undergo constant improvement in an effort to make them more prone to use by vehicle occupants. A major step improvement was the addition of a ratchet mechanism to selectively prevent retraction of the seat belt webbing onto the spool. By so doing, the belt can be positioned in a non-tension state about the vehicle occupant to provide an unencumbered feeling. To release the ratchet mechanism, a locking pawl must be disengaged from a ratchet wheel. The ideal operating conditions are such that when latched, the pawl is firmly engaged with the ratchet wheel to prevent motion thereof. Likewise, in its engaged and locked state, the pawl should resist undesired disengagement from the ratchet wheel. On the other hand, when it is desired to remove and retract the seat belt webbing, the pawl should disengage from the ratchet wheel with a minimum amount of force.

Wherefore, it is the object of the present invention to provide a releasable pawl for use with such a ratchet wheel which is secure in its locked and engaged state, but easily removable from engagement when such disengagement is desired.

SUMMARY OF THE INVENTION

The foregoing objective has been met in a seat belt retractor mechanism having a spring biased spool journal mounted to a housing for holding seat belt webbing for protraction and retraction wherein the spool has a ratchet wheel connected thereto and a pawl pivotally mounted to the housing for releasably engaging the ratchet wheel to prohibit retraction rotation of the spool by the improvement of the present invention comprising the pawl being in two parts hingedly joined together for movement between a locked position wherein the hinged joint between the members is stopped in an over-the-center state to hold the pawl rigid and a released position wherein the pawl is free to flex; and, pressure release means operably connected to the pawl for moving the pawl between the two positions.

In the preferred embodiment, the pressure release means comprises a cam disc mounted for concentric movement about the ratchet wheel wherein the disc has a camming surface in contact with the pawl adjacent the hinge point thereof for moving the pawl between the locked and released positions. Preferably, the pawl is biased towards the locked position such that it will return thereto upon release of pressure by the cam disc.

DESCRIPTION OF THE DRAWINGS

FIG. 1 is a simplified drawing of the mechanism of the present invention as incorporated into a seat belt retractor mechanism.

FIG. 2 is a simplified drawing of the pawl, ratchet wheel, and cam disc of the present invention in the unlocked position.

DESCRIPTION OF THE PREFERRED EMBODIMENT

Figure 3:
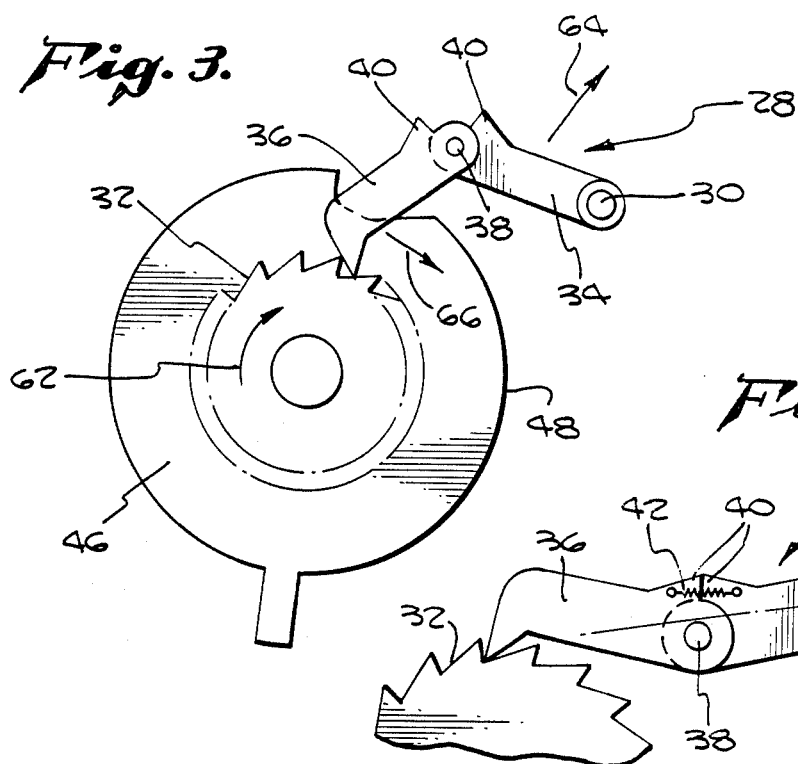
FIG. 3 is a simplified drawing of the pawl, ratchet wheel, and cam disc from FIG. 2 showing the flexing of the pawl to allow rotation of the ratchet wheel when in the unlocked position.

Turning first to FIG. 1, the present invention is shown incorporated into a seat belt retractor mechanism generally indicated as 10. It should be understood, however, that while the embodiment as being described herein is primarily directed to an application in seat belt retractor mechanisms, it could be incorporated in any similar mechanism where a ratchet wheel has a releasable pawl cooperating therewith and where it is desired to achieve the low force release benefits provided by the present invention.

Seat belt retractor mechanism 10 is of the type having a back plate 12 which has a pair of side plates 14 extending therefrom generally in a U-shape. A spool 16 is journal mounted between the side plates 14 on shaft 18. Seat belt webbing 20 is wound about the spool 16 for protraction and retraction. A spring (not shown) is operably connected to the spool 16 to bias it towards the retracted position such that the seat belt webbing 20 can be pulled out against the bias of the spring and, upon release, will be retracted onto the spool 16 by the force of the spring. The spool 16 is provided with teeth 22 along its outer periphery into which a locking plate 24 can be moved into engagement as shown in the ghosted position as a result of an emergency condition in order to prevent protraction of the seat belt webbing 20 to, thereby, restrain the vehicle occupant wearing the seat belt webbing 20 from undesired movement.

Seat belt retractor mechanisms of the type being shown in FIG. 1 also include a ratchet wheel 26 connected to move in combination with the spool 16. A releasable pawl, generally indicated as 28, is pivotal mounted on shaft 30 to the side plate 14 on one end with the opposite end being adapted to engage the teeth 32 of the ratchet wheel 26. In the prior art, the releasable pawl 28 was of unitary construction. Examples of such mechanisms can be seen by reference to the patents of Sprecher (U.S. Pat. Nos. 3,869,098) Francis (U.S. Pat. No. 3,700,184) and Heath (U.S. Pat. No. 3,834,646).

Figure 4:
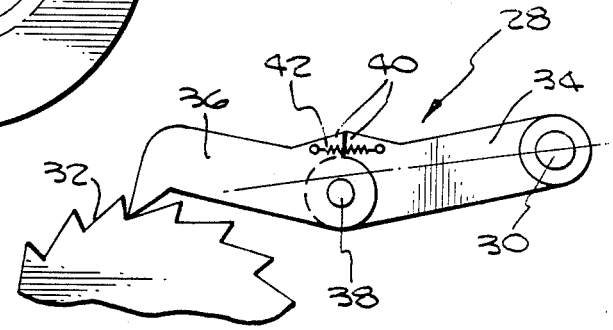
FIG. 4 is an enlarged view of the pawl of the present invention in its locked or over-the-center state.

According to the present invention, the unitary pawl is replaced by a two-part pawl as shown in the figures wherein the pawl 28 comprises a first portion 34 pivotally mounted on the shaft 30 at one end and a second portion 36 adapted on one end for engagement with the teeth 32 of the ratchet wheel 26. The other ends of the portions 34, 36 are hinged together about pivot 38. A pair of stop shoulders 40 are provided on respective ends of the portions 34 and 36 on the upper side of the pivot 38 so as to cause the pawl 28 to toggle and stop in an over-the-center state which is the locked position as shown in FIG. 1. The stop shoulders 40 are on the top surface of the pawl 28 positioned such that gravity tends to move the pawl 28 to its locked position of FIG. 1. Optionally, a spring 42 can be used to connect the stop shoulders 40 as shown in FIG. 4 so as to bias the pawl 28 towards the locked position alone or in combination with gravity. As also shown in FIG. 4, in the locked position the hinge pivot 28 is below a line through the shaft 30 and the contact point of the second portion 36 with the teeth 32. As a consequence, force by the teeth 32 against the pawl 28 in the direction of shaft 30 (i.e., a retracting force) tends to hold the pawl 28 more securely in its locked position. This, of course, is one of the desired objects of the present invention.

As shown in FIG. 1, the present invention further comprises a cam disc 46 concentrically disposed about the shaft 18 with its camming surface 48 in contact with the pawl 28 adjacent the hinge pivot 38. Camming surface 48 contains a notch 50 which is positioned adjacent to pivot 38 when the pawl 28 is in its locked position of FIG. 1. In the preferred embodiment, a solenoid 52 is operably connected to the cam disc 46. The solenoid 52 is connected by wire 54 to a control circuit for operation at desired times such as upon the opening of the vehicle doors, ignition "on", etc.

The cam disc 46 operates as a pressure release mechanism in the manner shown in FIG. 2. Upon the cam disc 46 being rotated by the solenoid (or otherwise) in the direction of the arrow 56, the pivot 38 is forced upward in the direction of arrow 58 by the camming surface 48 of the cam disc 46. By so doing, the pawl 28 toggles in the opposite direction and the over-the-center condition of FIGS. 1 and 3 is released so that the pawl 28 assumes the released position of FIGS. 2 and 5 wherein it is free to flex longitudinally as symbolized by the wavy arrow 60.

Figure 5:
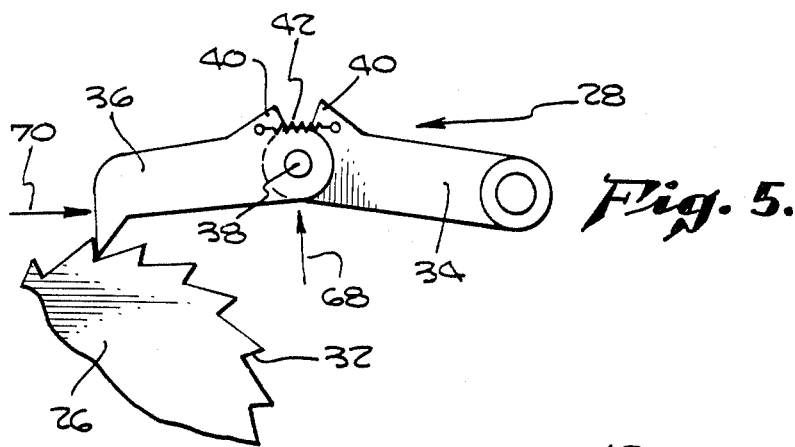
FIG. 5 is an enlarged view of the pawl of the present invention in its unlocked or released position.

Once the pawl 28 has been toggled to the released position of FIGS. 2 and 5, it is free to further flex and allow the ratchet wheel 6 to rotate in the direction of arrow 62 as shown in FIG. 3. As ratchet wheel 26 rotates in the direction of arrow 62, the teeth 32 push against the second portion 36. Since the pawl 28 is now free to flex, second portion 36 pushing against pivot 38 causes first portion 34 to rotate upward about shaft 30 in the direction of arrow 64. As first portion 34 rises, second portion 36 moves about pivot 38 in the direction of the arrow 66. This, of course, allows the ratchet wheel 26 to rotate in the direction of arrow 62 unencumbered by the pawl 28.

Figure 6:
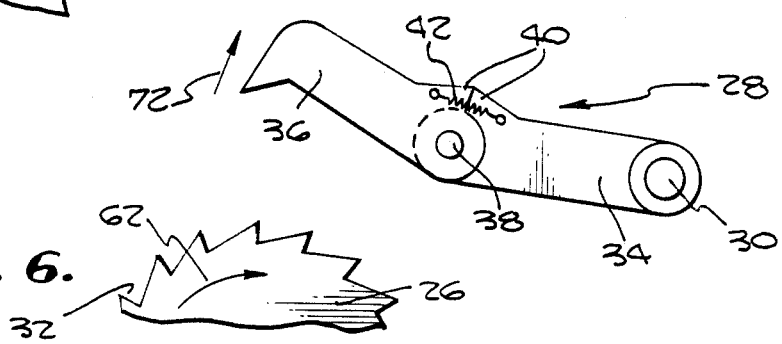
FIG. 6 is an enlarged view of the pawl of the present invention shown retracted by the spring which can be used optionally.

Turning now to FIGS. 4-6, it can be seen that if the optional spring 42 is employed tending to bias the pawl 28 to its locked position of FIG. 4, a different, slightly modified, sequence occurs. As shown in FIG. 5, as the cam disc 46 moves pivot 38 upward in the direction of arrow 68, the force of the teeth 32 against the second portion 36 as symbolized by the arrow 70 tends to pivot the pawl 28 in the manner of FIG. 3. The restorative force of the spring 42, however, tends to maintain the first and second portions 34, 36 in alignment. As a result, as the pivot 38 is raised, portion 36 comes out of engagement with teeth 32 and thereafter springs out of engagement to a retracted position as symbolized by the arrow 72 as shown in FIG. 6.

It should be recognized by those skilled in the art that the benefits of the present invention can also be utilized in a system wherein a positive rotating force is applied against first portion 34 to disengage the pawl 28 from the ratchet wheel 26. For example, shaft 30 could be connected to a rotating mechanism. If the hinged pawl 28 of the present invention is used in combination with the camming disc 46 to first release the pressure of the pawl 28, considerably less rotational force would be required on shaft 30 to completely disengage the pawl 28.

By way of example of the force reductions that can be achieved by the present invention, a tested prototype of the present invention as incorporated into a seat belt retractor mechanism as hereinbefore described reduced the release force required from 2.5 pounds to 0.5 pounds.

Wherefore, having thus described our invention, we claim:

1. In a seat belt retractor mechanism having a spring biased spool journal-mounted to a housing for holding seat belt webbing for protraction and retraction wherein the spool has a ratchet wheel connected thereto and a pawl is pivotally mounted to the housing for releasably engaging the teeth of the ratchet wheel to prohibit retraction rotation of the spool, the improvement comprising:
   (a) the pawl being in two parts hingeably joined together for movement between a locked position wherein the hinged joint between said two parts is stopped in the over-the-center state, wherein said hinged joint lies below a line through a first point where said pawl is pivotally mounted to the housing and a second point where said pawl engages the teeth of the ratchet wheel, to hold the pawl rigid and a released position, wherein said hinged joint lies above said line, wherein the pawl is free to flex; and,
   (b) pressure release means operably connected to the pawl for moving the pawl between said two positions.

2. The improvement to a seat belt retractor of claim 1 and additionally comprising:
   means operably connected for biasing the pawl towards said locked position.

3. The improvement to a seat belt retractor of claim 1 wherein:
   said pressure release means comprises a cam disc mounted for concentric movement about the ratchet wheel, said disc having a camming surface in contact with the pawl adjacent the hinge point thereof for moving the pawl between said locked and released positions.

4. The improvement to a seat belt retractor of claim 1 and additionally comprising:
   actuator means operably connected to said pressure release means for moving said pressure release means to place the pawl in the released stage upon the occurrence of pre-selected events with respect to the vehicle in which the retractor mechanism is mounted.

* * * * *